US012099279B2

(12) United States Patent
Ochiai et al.

(10) Patent No.: US 12,099,279 B2
(45) Date of Patent: Sep. 24, 2024

(54) LIGHT ADJUSTMENT DEVICE

(71) Applicant: Japan Display Inc., Tokyo (JP)

(72) Inventors: Takahiro Ochiai, Tokyo (JP); Shunpei Takeuchi, Tokyo (JP); Osamu Kobayashi, Tokyo (JP); Hiroya Morimoto, Tokyo (JP); Takeo Koito, Tokyo (JP); Koichi Nagao, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/231,915

(22) Filed: Aug. 9, 2023

(65) Prior Publication Data

US 2023/0384640 A1 Nov. 30, 2023

Related U.S. Application Data

(63) Continuation of application No. PCT/JP2021/046675, filed on Dec. 17, 2021.

(30) Foreign Application Priority Data

Feb. 25, 2021 (JP) .................. 2021-029045

(51) Int. Cl.
*G02F 1/1347* (2006.01)
*G02F 1/01* (2006.01)
(Continued)

(52) U.S. Cl.
CPC .......... *G02F 1/1347* (2013.01); *G02F 1/0136* (2013.01); *G02F 1/133545* (2021.01); *G02F 1/136209* (2013.01); *G02F 1/13629* (2021.01)

(58) Field of Classification Search
CPC ............ G02F 1/136209; G02F 1/1347; G02F 1/13471; G02F 1/1345
See application file for complete search history.

(56) References Cited

U.S. PATENT DOCUMENTS 6,097,457 A * 8/2000 Kim ................. G02F 1/133512
349/110
2006/0071243 A1* 4/2006 Hsu ....................... G02F 1/1345
257/E27.111

(Continued)

FOREIGN PATENT DOCUMENTS

JP H02-65001 A 3/1990
JP 2010-281961 A 12/2010
(Continued)

OTHER PUBLICATIONS

International Search Report issued in International Patent Application No. PCT/JP2021/046675 on Mar. 1, 2022 and English translation of same. 5 pages.

(Continued)

*Primary Examiner* — Alexander P Gross
(74) *Attorney, Agent, or Firm* — K&L Gates LLP

(57) ABSTRACT

A light adjustment device includes a plurality of liquid crystal cells each including a light adjustment region that polarizes light emitted from a light source, the liquid crystal cells being stacked in a direction in which the light is emitted. The liquid crystal cells each include a first substrate in which a plurality of first metal wires are provided, and a second substrate in which a plurality of second metal wires are provided and that sandwiches a liquid crystal layer with the first substrate.

4 Claims, 13 Drawing Sheets

(51) Int. Cl.
*G02F 1/1335* (2006.01)
*G02F 1/1362* (2006.01)

(56) References Cited

U.S. PATENT DOCUMENTS

| | | |
|---|---|---|
| 2010/0149444 A1* | 6/2010 | Hikmet .............. G02F 1/134363 |
| | | 349/122 |
| 2013/0128192 A1 | 5/2013 | Ishikawa et al. |
| 2013/0301263 A1 | 11/2013 | Yamanaka |
| 2015/0185549 A1 | 7/2015 | Jeon et al. |
| 2017/0248829 A1* | 8/2017 | Koito ..................... G02B 30/27 |
| 2018/0196318 A1 | 7/2018 | Presniakov et al. |
| 2019/0047476 A1* | 2/2019 | Ohira ...................... B60R 11/04 |
| 2019/0258069 A1* | 8/2019 | Song ......................... G02F 1/29 |
| 2019/0302516 A1* | 10/2019 | Chen ................. G02F 1/133514 |

FOREIGN PATENT DOCUMENTS

| | | |
|---|---|---|
| JP | 2011-150187 A | 8/2011 |
| JP | 2019-032491 A | 2/2019 |
| WO | WO2012/017617 A1 | 2/2012 |
| WO | WO2012/102349 A1 | 8/2012 |

OTHER PUBLICATIONS

Written Opinion issued in International Patent Application No. PCT/JP2021/046675 on Mar. 1, 2022. 4 pages.

Office Action issued in related Japanese Patent Application No. 2023-502097 issued Mar. 5, 2024 and English translation of same. 7 pages.

\* cited by examiner

FIG.1
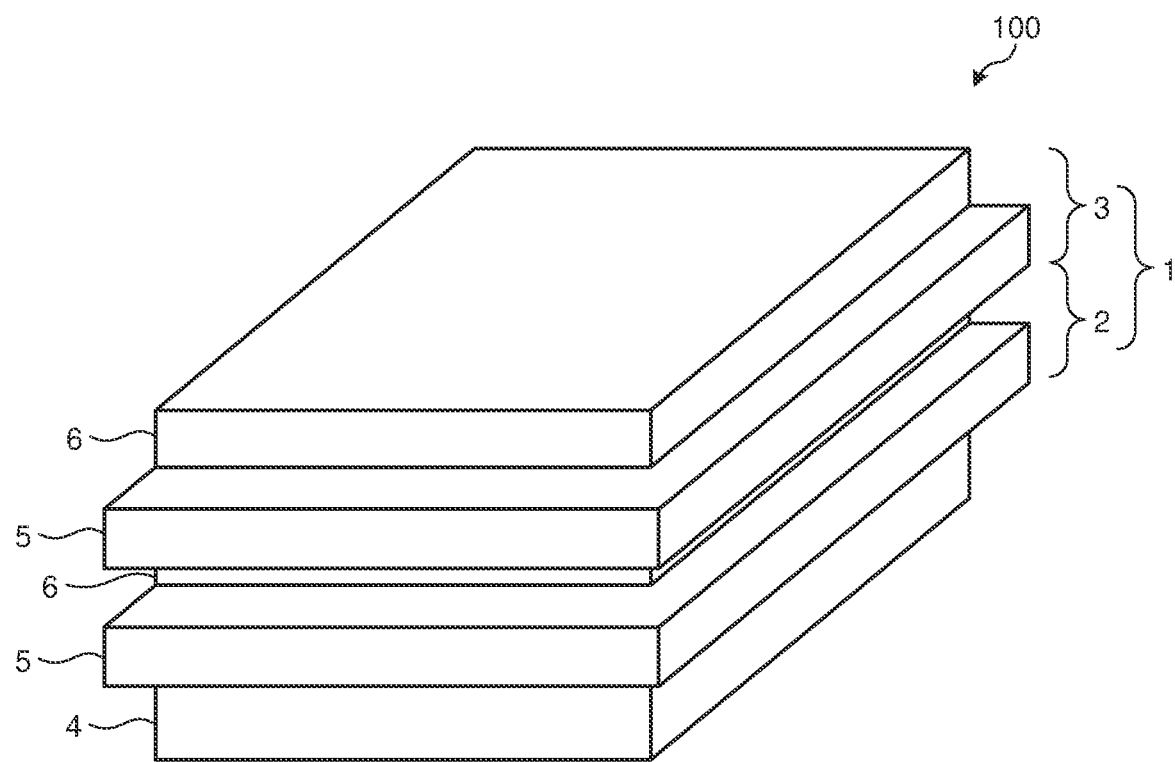
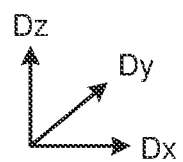

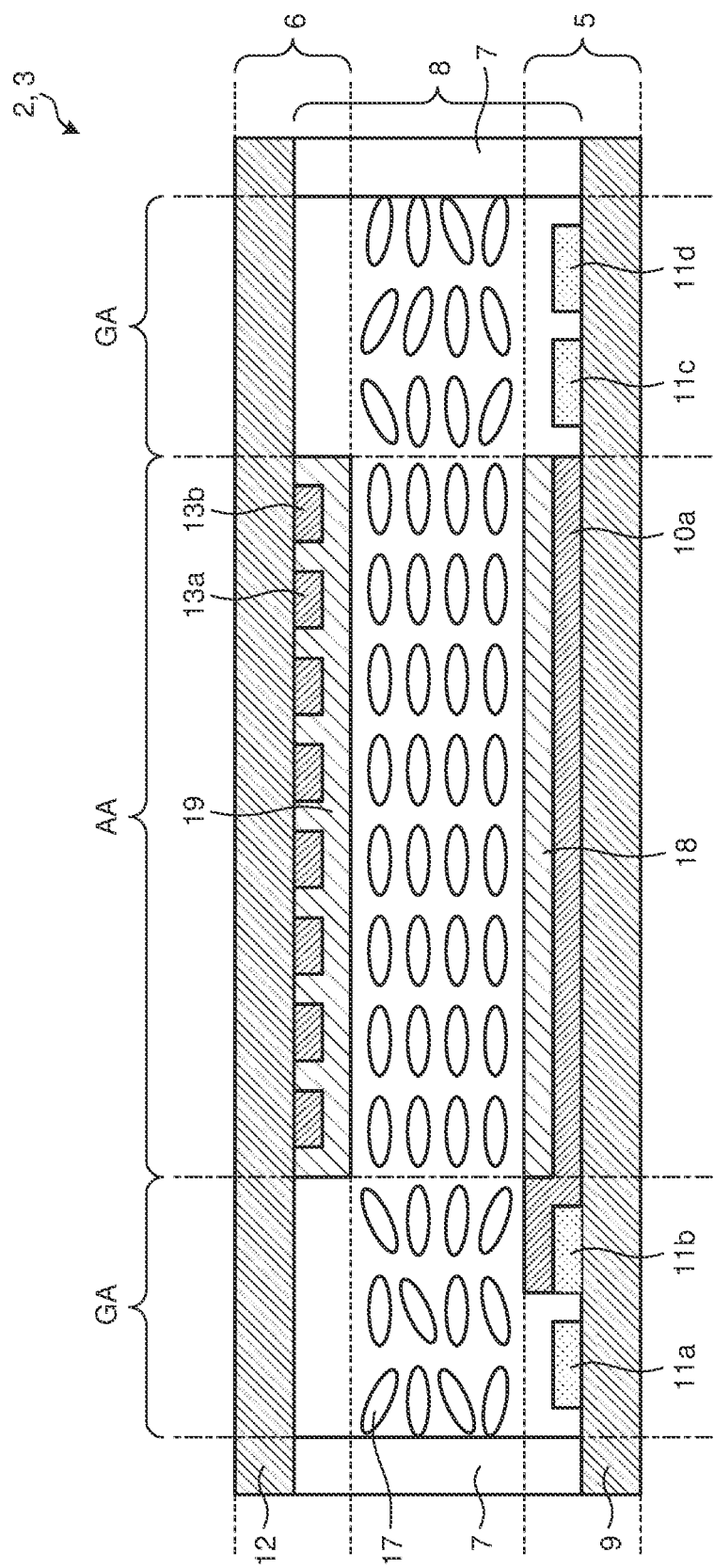

LIGHT ADJUSTMENT DEVICE

CROSS-REFERENCE TO RELATED APPLICATION

This application is a continuation of International Patent Application No. PCT/JP2021/046675 filed on Dec. 17, 2021, and which claims the benefit of priority from Japanese Patent Application No. 2021-029045, filed on Feb. 25, 2021, the entire contents of which are incorporated herein by reference.

BACKGROUND

1. Technical Field

The present invention relates to a light adjustment device.

2. Description of the Related Art

In a conventional illumination instrument, a light source such as an LED is combined with a thin lens provided with a prism pattern, and the distance between the light source and the thin lens is changed to change a light distribution angle. In such an illumination instrument, a small-sized motor is used to drive the thin lens to change the distance between the light source and the thin lens. For example, in a disclosed illumination instrument, the front of a transparent light bulb is covered by a liquid crystal light adjustment element, and the transmittance of a liquid crystal layer is changed to switch directly reaching light and scattering light (refer to Japanese Patent Application Laid-open Publication No. H02-65001, for example).

In a configuration including a liquid crystal cell, electrodes are provided on two substrates sandwiching a liquid crystal layer, and the orientation of liquid crystal molecules is controlled by applying drive voltage between the electrodes provided on the two substrates. An alignment film is provided in a region in which electrodes are provided to control the orientation of liquid crystal molecules, but in its peripheral region, the liquid crystal molecules cannot be controlled and thus orientation disorder and light leakage occur, which potentially leads to degradation of a light modulation function.

The present invention is intended to provide a light modulation device that can prevent degradation of a light modulation function.

SUMMARY

A light adjustment device according to an embodiment of the present disclosure includes a plurality of liquid crystal cells each including a light adjustment region that polarizes light emitted from a light source, the liquid crystal cells being stacked in a direction in which the light is emitted. The liquid crystal cells each include a first substrate in which a plurality of first metal wires are provided, and a second substrate in which a plurality of second metal wires are provided and that sandwiches a liquid crystal layer with the first substrate, the first metal wires are provided at intervals in a wiring layer on the first substrate, the second metal wires are provided at intervals in a wiring layer on the second substrate, and across the entire surface of a peripheral region outside the light adjustment region of at least one of the liquid crystal cells, light is blocked at gaps between the first metal wires by the second metal wires in the direction in which the light is emitted, and light is blocked at gaps between the second metal wires by the first metal wires in the direction in which the light is emitted.

A light adjustment device according to an embodiment in which a plurality of liquid crystal cells each including a light adjustment region that polarizes light emitted from a light source are stacked in a direction in which light is emitted is disclosed. The liquid crystal cells each include a first substrate, and a second substrate sandwiching a liquid crystal layer with the first substrate, and across the entire surface of a peripheral region outside the light adjustment region of at least one of the liquid crystal cells, a light-shielding layer is provided on a substrate closer to a light emission target among the first and second substrates.

BRIEF DESCRIPTION OF THE DRAWINGS

FIG. 1 is a perspective view illustrating an example of an illumination instrument in which a light adjustment device according to an embodiment is provided;

FIG. 5 is a sectional view along line A-A' illustrated in FIG. 4;

DETAILED DESCRIPTION

Figure 2:
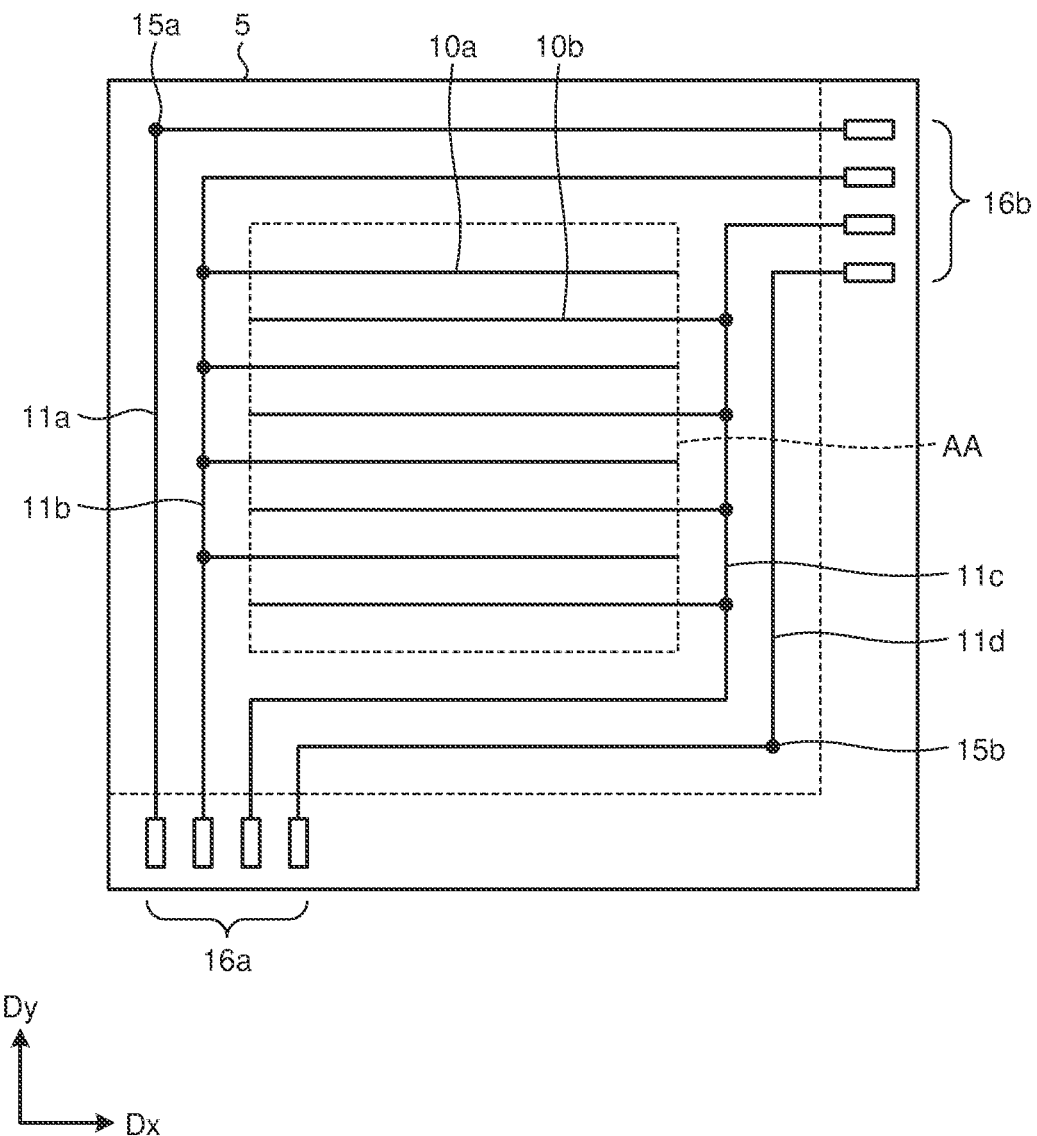
FIG. 2 is a schematic plan view of a first substrate when viewed in a Dz direction.

Aspects (embodiments) of the invention will be described below in detail with reference to the accompanying drawings. Contents described below in the embodiments do not limit the present invention. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the invention is contained in the scope of the present invention.

For clearer description, the drawings are schematically illustrated for the width, thickness, shape, and the like of each component as compared to an actual aspect in some cases, but the drawings are merely exemplary and do not limit interpretation of the present invention. In the present specification and drawings, any element same as that already described with reference to an already described drawing is denoted by the same reference sign, and detailed description thereof is omitted as appropriate in some cases.

FIG. 1 is a perspective view illustrating an example of an illumination instrument in which a light adjustment device according to an embodiment is provided. First, a light adjustment device 1 according to the embodiment will be schematically described below.

As illustrated in FIG. 1, the light adjustment device 1 of the present embodiment includes a first liquid crystal cell 2 and a second liquid crystal cell 3.

An illumination instrument 100 includes the light adjustment device 1 and a light source 4. The light source 4 emits light toward the light adjustment device 1. The light source 4 is configured as, for example, a light emitting diode (LED).

In FIG. 1, a direction on a plane of the light adjustment device 1 is defined as a Dx direction, and a direction orthogonal to the Dx direction on the plane of the light adjustment device 1 is defined as a Dy direction. A direction orthogonal to the Dx-Dy plane is defined as a Dz direction.

The Dz direction indicates the emission direction of light from the light source 4. The illumination instrument 100 has a configuration in which the first liquid crystal cell 2 and the second liquid crystal cell 3 are stacked in the Dz direction. Hereinafter, a side where a radiation surface (or upper surface) through which light is radiated from the light adjustment device 1 in the Dz direction is positioned is also referred to as a radiation surface side (or upper surface side), and a side where a back surface (or lower surface) opposite the radiation surface (or upper surface) in the Dz direction is positioned is also referred to as an entrance surface side (or lower surface side).

An alignment film 18 and an alignment film 19 have rubbing directions different from each other as described later. The first liquid crystal cell 2 and the second liquid crystal cell 3 have the same configuration. In the present embodiment, the first liquid crystal cell 2 is a liquid crystal cell for p-wave polarized light. The second liquid crystal cell 3 is a liquid crystal cell for s-wave polarized light. Accordingly, flexible light adjustment control is possible. Note that the first liquid crystal cell 2 may be a liquid crystal cell for s-wave polarized light, and the second liquid crystal cell 3 may be a liquid crystal cell for p-wave polarized light. It suffices that one of the first liquid crystal cell 2 and the second liquid crystal cell 3 is a liquid crystal cell for p-wave polarized light and the other is a liquid crystal cell for s-wave polarized light.

Figure 3:
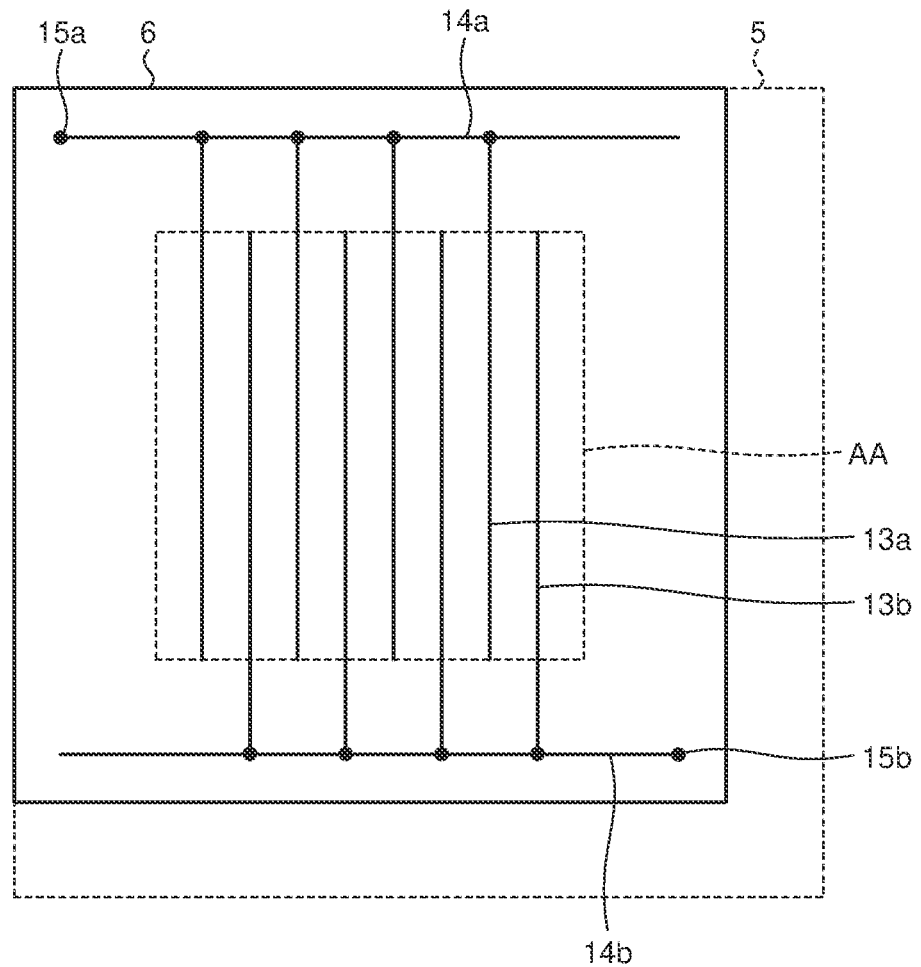
FIG. 3 is a schematic plan view of a second substrate when viewed in the Dz direction.
Figure 4:
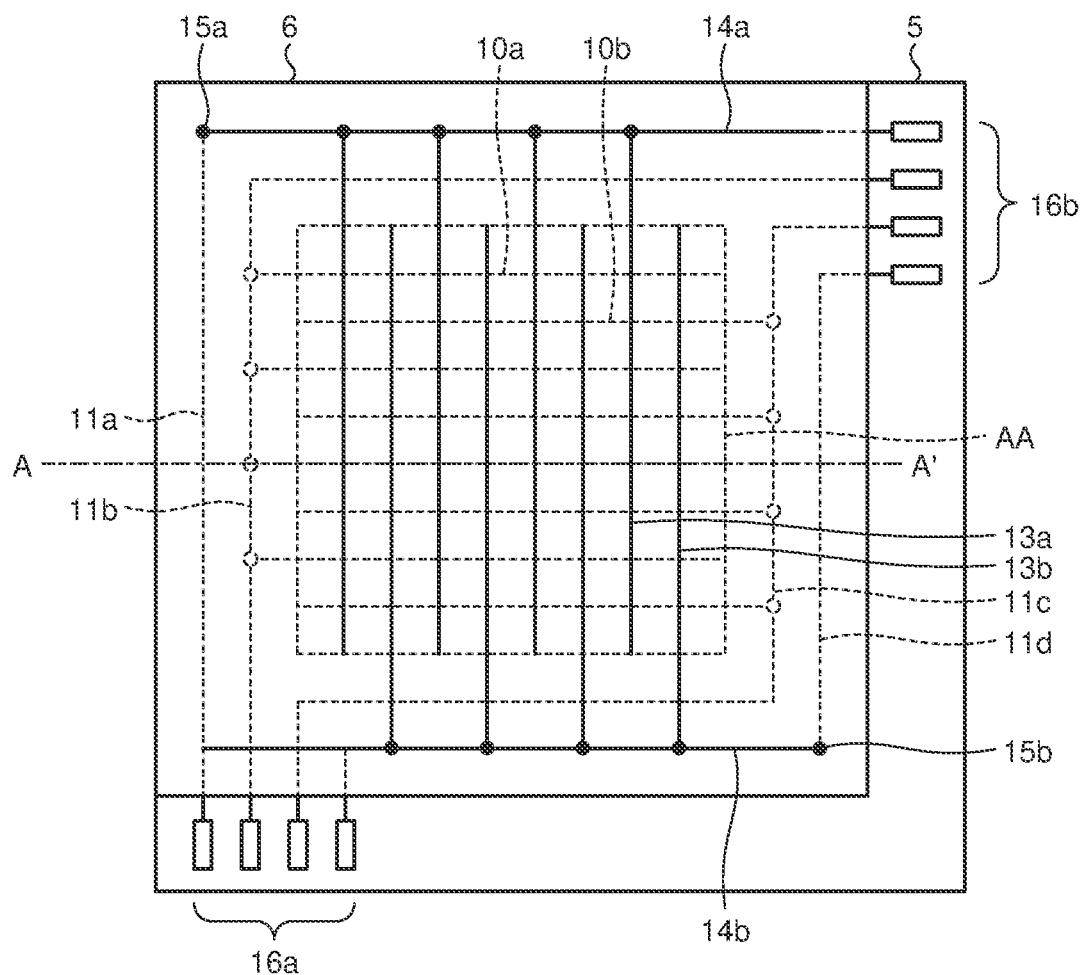
FIG. 4 is a perspective diagram of a liquid crystal cell in which the first substrate and the second substrate are placed over in the Dz direction.

The first liquid crystal cell 2 and the second liquid crystal cell 3 each include a first substrate 5 and a second substrate 6. FIG. 2 is a schematic plan view of the first substrate when viewed in the Dz direction. FIG. 3 is a schematic plan view of the second substrate when viewed in the Dz direction. FIG. 4 is a perspective diagram of a liquid crystal cell in which the first substrate and the second substrate are placed over in the Dz direction. FIG. 5 is a sectional view along line A-A' illustrated in FIG. 4.

As illustrated in FIG. 5, the first liquid crystal cell 2 and the second liquid crystal cell 3 each include a liquid crystal layer 8 between the first substrate 5 and the second substrate 6, the liquid crystal layer 8 being circumferentially sealed by a sealing member 7.

The liquid crystal layer 8 modulates light passing through the liquid crystal layer 8 in accordance with the state of an electric field. The liquid crystal layer 8 may be a horizontal electric field mode such as fringe field switching (FFS) as a form of in-plane switching (IPS) or may be a vertical electric field mode. For example, liquid crystals of various modes such as twisted nematic (TN), vertical alignment (VA), and electrically controlled birefringence (ECB) may be used and are not limited by the kind and configuration of the liquid crystal layer 8.

As illustrated in FIG. 2, a plurality of drive electrodes 10a and 10b, a plurality of metal wires 11a and 11b that supply drive voltage applied to the drive electrodes 10, and a plurality of metal wires 11c and 11d that supply drive voltage applied to a plurality of drive electrodes 13a and 13b (refer to FIG. 3) provided on the second substrate 6 to be described later are provided on the liquid crystal layer 8 side of a base material 9 of the first substrate 5 illustrated in FIG. 5. The metal wires 11a, 11b, 11c, and 11d are provided in a wiring layer of the first substrate 5. The metal wires 11a, 11b, 11c, and 11d are provided at intervals in the wiring layer on the first substrate 5. Hereinafter, the drive electrodes 10a and 10b are also simply referred to as "drive electrodes 10". The metal wires 11a, 11b, 11c, and 11d are also referred to as "first metal wires 11". As illustrated in FIG. 2, the drive electrodes 10 on the first substrate 5 extend in the Dx direction (first direction).

As illustrated in FIG. 3, the drive electrodes 13a and 13b and a plurality of metal wires 14a and 14b that supply drive voltage applied to the drive electrodes 13 are provided on the liquid crystal layer 8 side of a base material 12 of the second substrate 6 illustrated in FIG. The metal wires 14a and 14b are provided in a wiring layer of the second substrate 6. The metal wires 14a and 14b are provided at intervals in the wiring layer on the second substrate 6. Hereinafter, the drive electrodes 13a and 13b are also simply referred to as "drive electrodes 13". The metal wires 14a and 14b are also referred to as "second metal wires 14". As illustrated in FIG. 3, the drive electrodes 13 on the second substrate 6 extend in the Dy direction (second direction).

The drive electrodes 10 and 13 are translucent electrodes formed of a translucent conductive material (translucent conductive oxide) such as indium tin oxide (ITO). The first substrate 5 and the second substrate 6 are translucent substrates such as glass or resin. The first metal wires 11 and the second metal wires 14 are formed of at least one metallic material such as aluminum (Al), copper (Cu), silver (Ag), molybdenum (Mo), or an alloy thereof. The first metal wires 11 and the second metal wires 14 may be multilayered bodies of a plurality of stacked layers using one or more of these metallic materials. At least one metallic material such as aluminum (Al), copper (Cu), silver (Ag), molybdenum (Mo), or an alloy thereof has a lower resistance than translucent conductive oxide such as ITO.

The metal wire 11a of the first substrate 5 and the metal wire 14a of the second substrate 6 are coupled to each other through a conduction part 15a such as a via. The metal wire 11d of the first substrate 5 and the metal wire 14b of the second substrate 6 are coupled to each other through a conduction part 15b such as a via.

Coupling (flex-on-board) terminal parts 16a and 16b that are coupled to non-illustrated flexible printed circuits (FPCs) are provided in regions on the first substrate 5, the regions not overlapping the second substrate 6 in the Dz direction.

The coupling terminal parts 16a and 16b each include four coupling terminals corresponding to the metal wires 11a, 11b, 11c, and 11d, respectively.

The coupling terminal parts 16a and 16b are provided in the wiring layer of the first substrate 5. Drive voltage to be applied to the drive electrodes 10a and 10b on the first substrate 5 and the drive electrodes 13a and 13b on the second substrate 6 is supplied to the first liquid crystal cell 2 and the second liquid crystal cell 3 from an FPC coupled to the coupling terminal part 16a or 16b. Hereinafter, the coupling terminal parts 16a and 16b are also simply referred to as "coupling terminal parts 16".

As illustrated in FIG. 4, in the first liquid crystal cell 2 and the second liquid crystal cell 3, the first substrate 5 and the second substrate 6 overlap each other in the Dz direction (light emission direction), and the drive electrodes 10 on the first substrate 5 intersect the drive electrodes 13 on the second substrate 6 when viewed in the Dz direction. In the first liquid crystal cell 2 and the second liquid crystal cell 3 thus configured, the orientation of liquid crystal molecules 17 in the liquid crystal layer 8 can be controlled by supplying drive voltage to the drive electrodes 10 on the first substrate 5 and the drive electrodes 13 on the second substrate 6. A region in which the orientation of the liquid crystal molecules 17 in the liquid crystal layer 8 can be controlled is referred to as a "light adjustment region AA". Light transmitting through the light adjustment region AA of the first liquid crystal cell 2 and the second liquid crystal cell 3 can be controlled by changing refractive index distribution of the liquid crystal layer 8 in the light adjustment region AA. A region in which the liquid crystal layer 8 is sealed by the sealing member 7 outside a light adjustment region 200 is referred to as a "peripheral region GA" (refer to FIG. 5).

As illustrated in FIG. 5, in the light adjustment region of the first substrate 5, the drive electrodes 10 (in FIG. 5, the drive electrode 10a) are covered by the alignment film 18. In the light adjustment region of the second substrate 6, the drive electrodes 13 (in FIG. 5, the drive electrodes 13a and 13b) are covered by the alignment film 19. As described above, the alignment films 18 and 19 have rubbing directions different from each other.

Figure 6A:
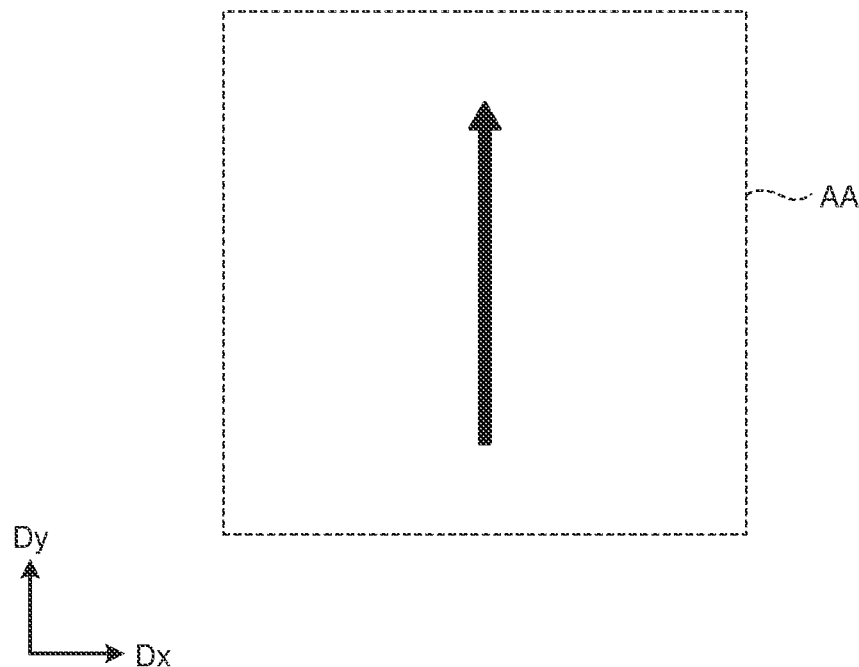
FIG. 6A is a diagram illustrating the rubbing direction of an alignment film of the first substrate.
Figure 6B:
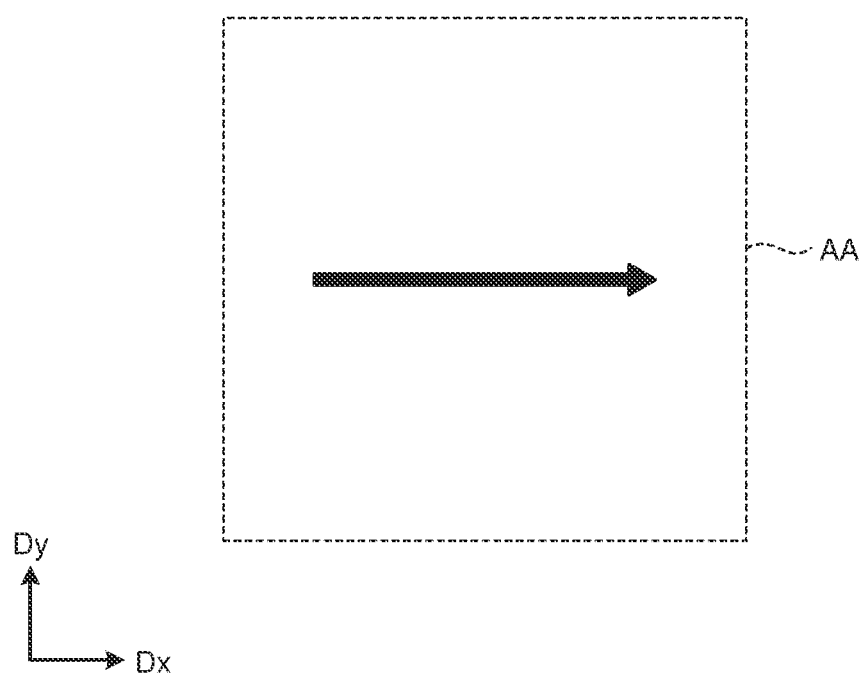
FIG. 6B is a diagram illustrating the rubbing direction of an alignment film of the second substrate.

FIG. 6A is a diagram illustrating the rubbing direction of the alignment film of the first substrate. FIG. 6B is a diagram illustrating the rubbing direction of the alignment film of the second substrate.

As illustrated in FIGS. 6A and 6B, the rubbing direction of the alignment film 18 of the first substrate and the rubbing direction of the alignment film 19 of the second substrate intersect each other in a plan view. Specifically, the rubbing direction of the alignment film 18 of the first substrate 5 illustrated in FIG. 6A is orthogonal to the direction in which the drive electrodes 10a and 10b extend. The rubbing direction of the alignment film 19 of the second substrate 6 illustrated in FIG. 6B is orthogonal to the direction in which the drive electrodes 13a and 13b extend.

Note that, in the present embodiment, as illustrated in FIG. 2, the coupling terminal parts 16a and 16b in different orientations are provided in a region extending in the Dx direction and a region extending in the Dy direction, respectively, on the first substrate 5 in which the first substrate 5 and the second substrate 6 do not overlap each other in the Dz direction. Accordingly, FPCs can be coupled to the first liquid crystal cell 2 and the second liquid crystal cell 3 in different directions, which improves operability.

The illumination instrument 100 can be downsized when used with the light adjustment device 1 according to the present embodiment described above in the structure illustrated in FIG. 1.

Although the present embodiment describes the configuration in which one first liquid crystal cell 2 for p-wave polarized light and one second liquid crystal cell 3 for s-wave polarized light are stacked, the present invention is not limited to the configuration, and for example, a plurality of combinations of stacked first liquid crystal cell 2 and second liquid crystal cell 3 may be provided. For example, two combinations of stacked first liquid crystal cell 2 and second liquid crystal cell 3 may be provided, in other words, two liquid crystal cells for p-wave polarized light and two liquid crystal cells for s-wave polarized light may be provided so that light adjustment control can be more flexibly performed.

First Embodiment

The peripheral region GA outside the light adjustment region AA is a region in which the above-described light adjustment control is impossible. Thus, orientation disorder of the liquid crystal molecules 17 occurs in the peripheral region GA outside the light adjustment region AA. The first metal wires 11 on the first substrate 5 and the second metal wires 14 on the second substrate 6 in the peripheral region GA provide more light shieldability than translucent conductive oxide such as ITO, but as illustrated in FIG. 5, for example, light leakage occurs from the gaps between the first metal wires 11 on the first substrate 5, which potentially leads to degradation of a light adjustment function.

Figure 7:
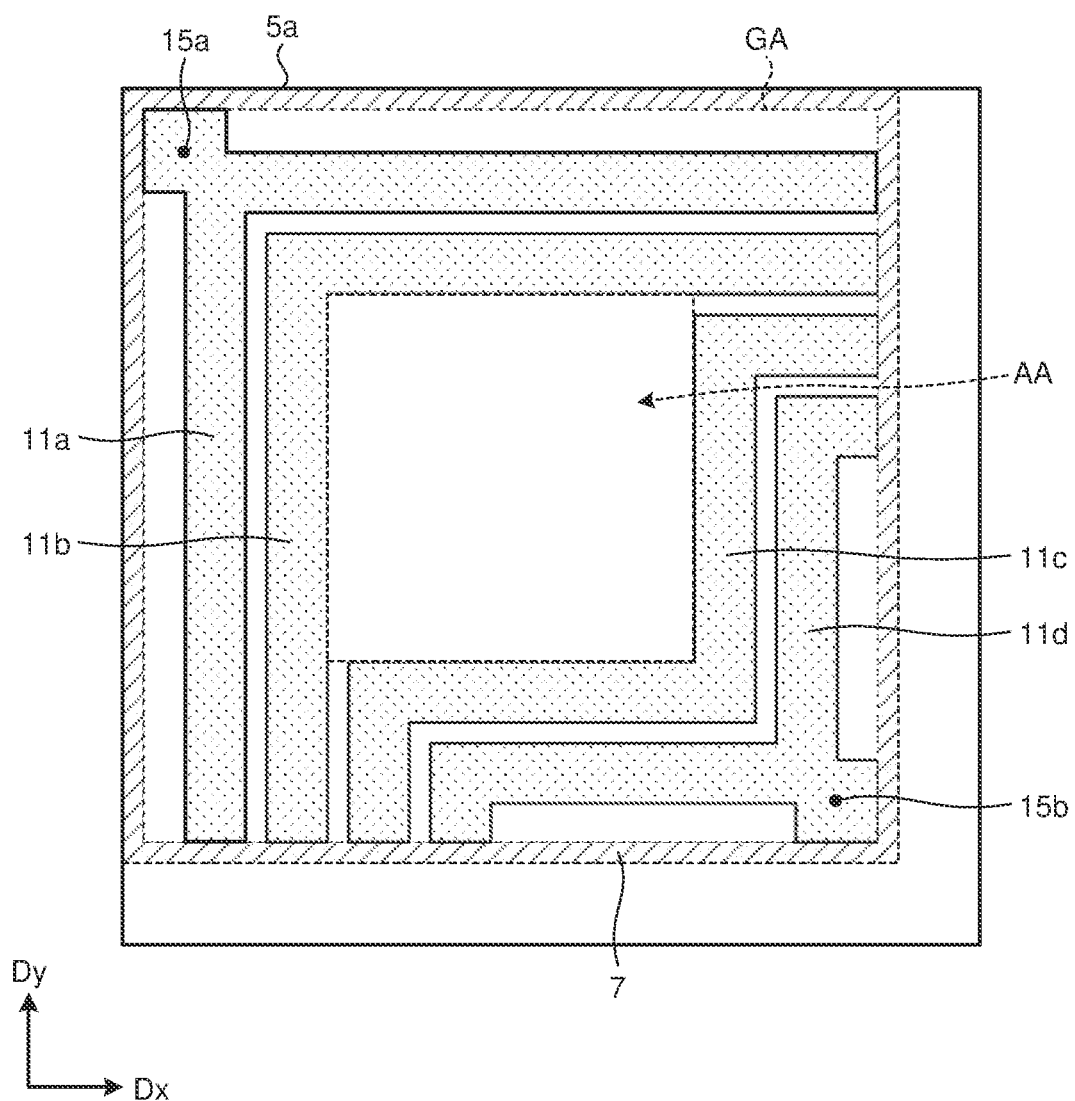
FIG. 7 is a plan view of a peripheral region on a first substrate of a light adjustment device according to a first embodiment when viewed in the Dz direction.
Figure 8:
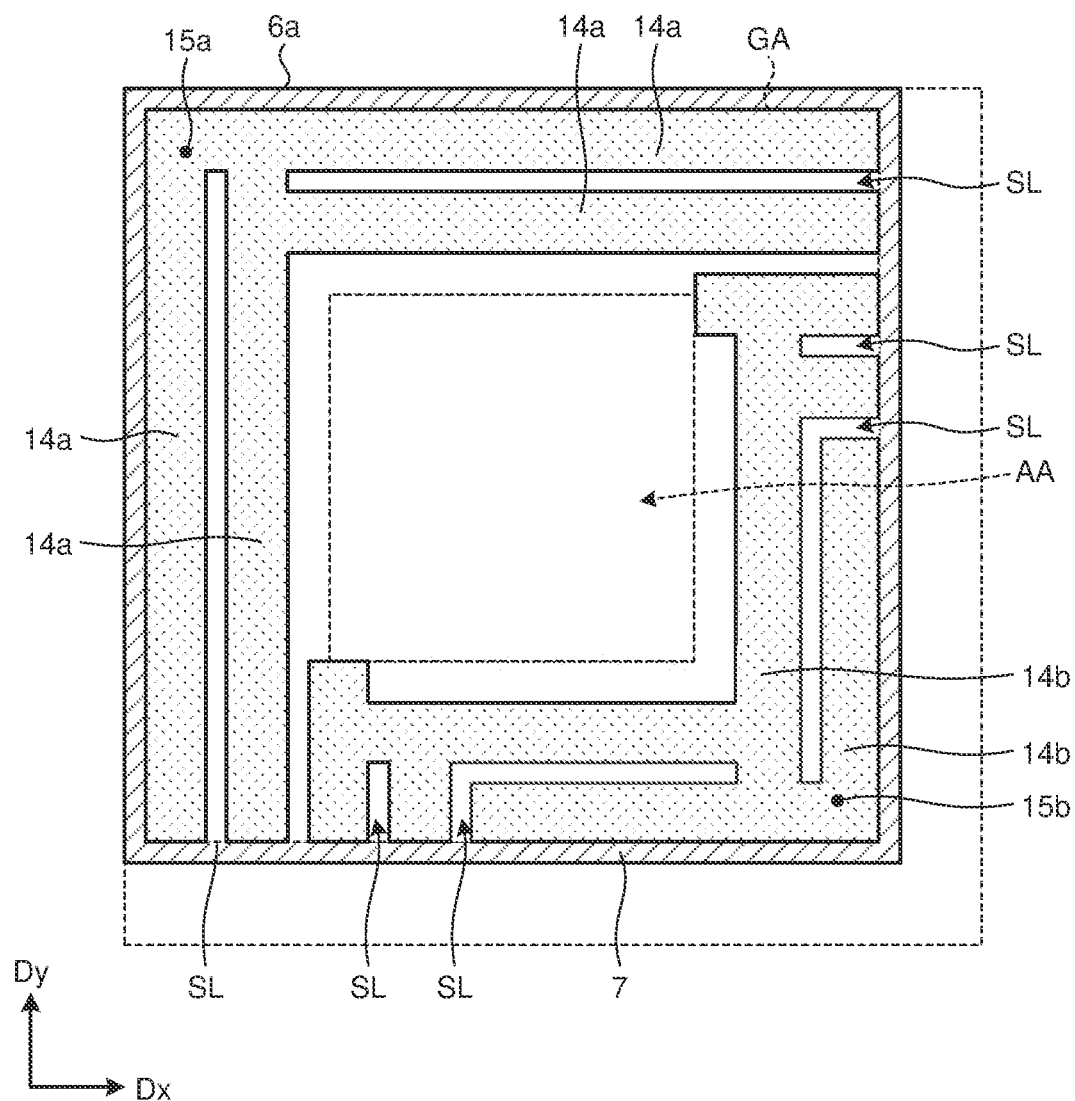
FIG. 8 is a plan view of a peripheral region on a second substrate of the light adjustment device according to the first embodiment when viewed in the Dz direction.
Figure 9:
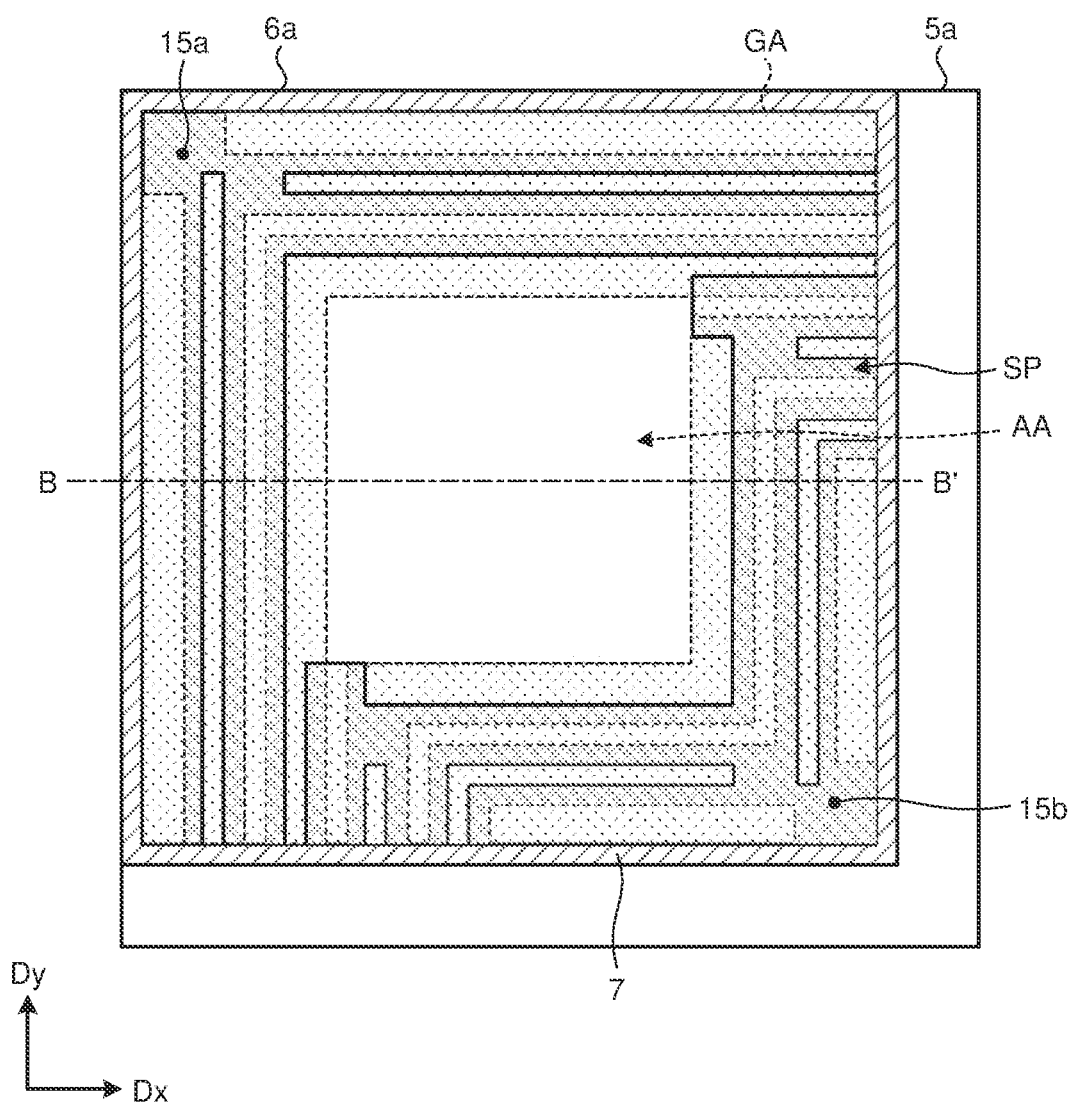
FIG. 9 is a perspective diagram in which the first substrate and the second substrate of the light adjustment device according to the first embodiment are placed over in the Dz direction.
Figure 10:
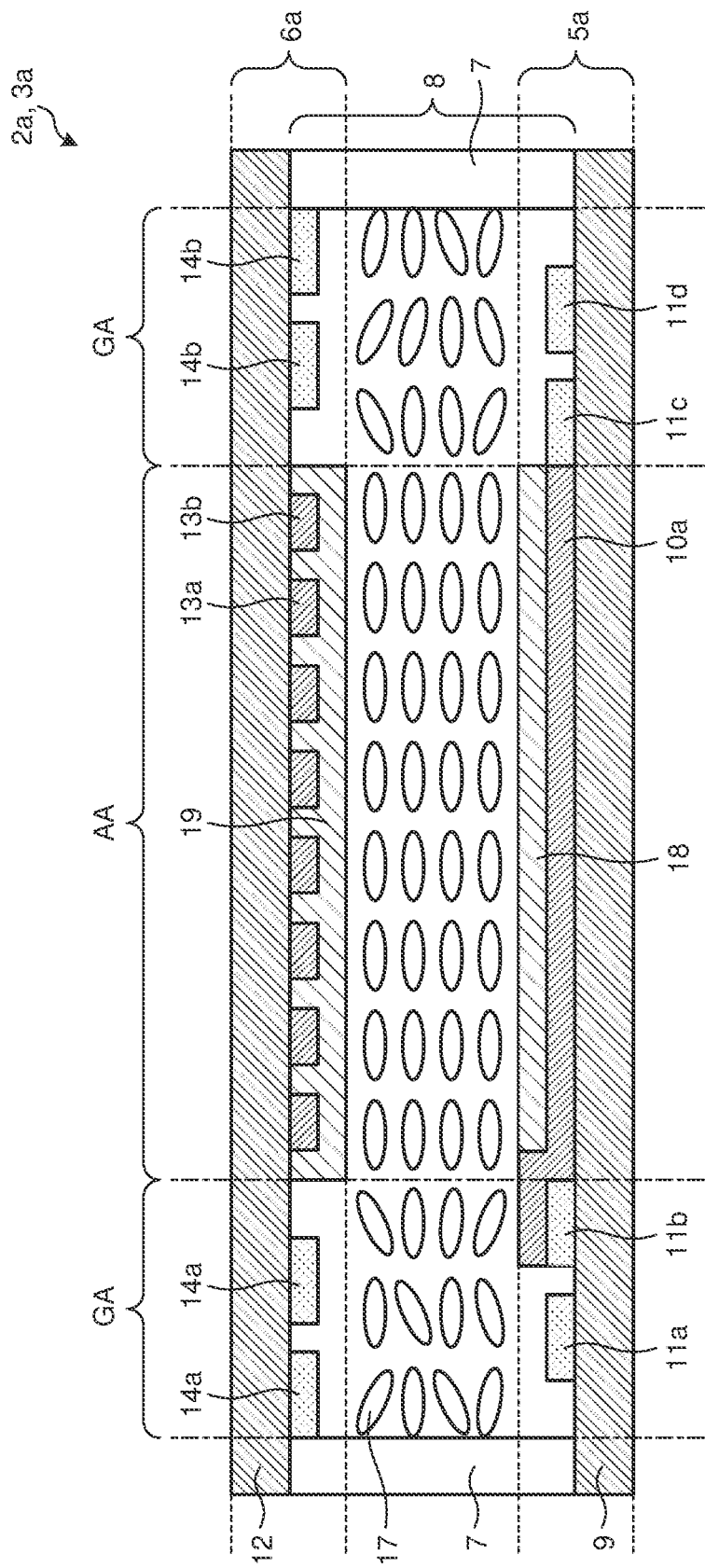
FIG. 10 is a sectional view along line B-B' illustrated in FIG. 9.

FIG. 7 is a plan view of the peripheral region on a first substrate of a light adjustment device according to a first embodiment when viewed in the Dz direction. FIG. 8 is a plan view of the peripheral region on a second substrate of the light adjustment device according to the first embodiment when viewed in the Dz direction. FIG. 9 is a perspective diagram in which the first and second substrates of the light adjustment device according to the first embodiment are placed over in the Dz direction. FIG. 10 is a sectional view along line B-B' illustrated in FIG. 9. Note that, in FIGS. 7, 8, and 9, illustration in the light adjustment region AA is omitted for simplification.

In the configuration of the first embodiment illustrated in FIGS. 7, 8, 9, and 10, as illustrated in the perspective diagram illustrated in FIG. 9, across the entire surface of the peripheral region GA outside the light adjustment region AA, light is blocked at the gaps between the first metal wires 11 (metal wires 11a, 11b, 11c, and 11d) on a first substrate 5a by the second metal wires 14 (metal wires 14a and 14b) on the second substrate 6 in the light emission direction (Dy direction). In addition, light is blocked at the gaps between the second metal wires 14 (metal wires 14a and 14b) on the second substrate 6 by the first metal wires 11 (metal wires 11a, 11b, 11c, and 11d) on the first substrate 5a in the light emission direction (Dy direction). Accordingly, the first metal wires 11 on the first substrate 5a are partially superimposed on the second metal wires 14 on the second substrate 6 in the Dz direction.

The widths of the first metal wires 11 on the first substrate 5a and the second metal wires 14 on the second substrate 6 are, for example, approximately 10 [μm], and the widths of superimposition parts SP at which the first metal wires 11 on the first substrate 5a and the second metal wires 14 on a second substrate 6a are superimposed are, for example, approximately 5 [μm].

Note that, for example, when the widths of the first metal wires 11 on the first substrate 5a and the second metal wires 14 on the second substrate 6a are too large, an ESD problem such as electrostatic discharge failure is likely to occur. Thus, as illustrated in, for example, FIG. 8, slits SL are desirably provided at the second metal wires 14 on the second substrate 6a (the first metal wires 11 on the first substrate 5a) to avoid the too large wire widths.

With such a configuration, light leakage attributable to orientation disorder of the liquid crystal molecules 17 can be prevented in the peripheral region GA outside the light adjustment region AA.

Note that, when a first liquid crystal cell 2a and a second liquid crystal cell 3a are stacked to constitute the light adjustment device 1, the configuration of the first embodiment illustrated in FIGS. 7, 8, 9, and 10 may be applied to at least one of the liquid crystal cells. More preferably, the configuration of the first embodiment illustrated in FIGS. 7, 8, 9, and 10 is desirably applied to the second liquid crystal cell 3a closer to a target object of light emission from the illumination instrument 100. For example, in a configuration including a plurality of combinations of stacked first liquid crystal cell 2a and second liquid crystal cell 3a, the configuration of the first embodiment illustrated in FIGS. 7, 8, 9, and 10 is desirably applied to a liquid crystal cell closer to a target object of light emission from the illumination instrument 100.

With the above-described configuration of the first embodiment, light leakage attributable to orientation disorder of the liquid crystal molecules 17 can be prevented in the peripheral region GA outside the light adjustment region AA, and thus degradation of a light adjustment function can be prevented.

Second Embodiment

Figure 11:
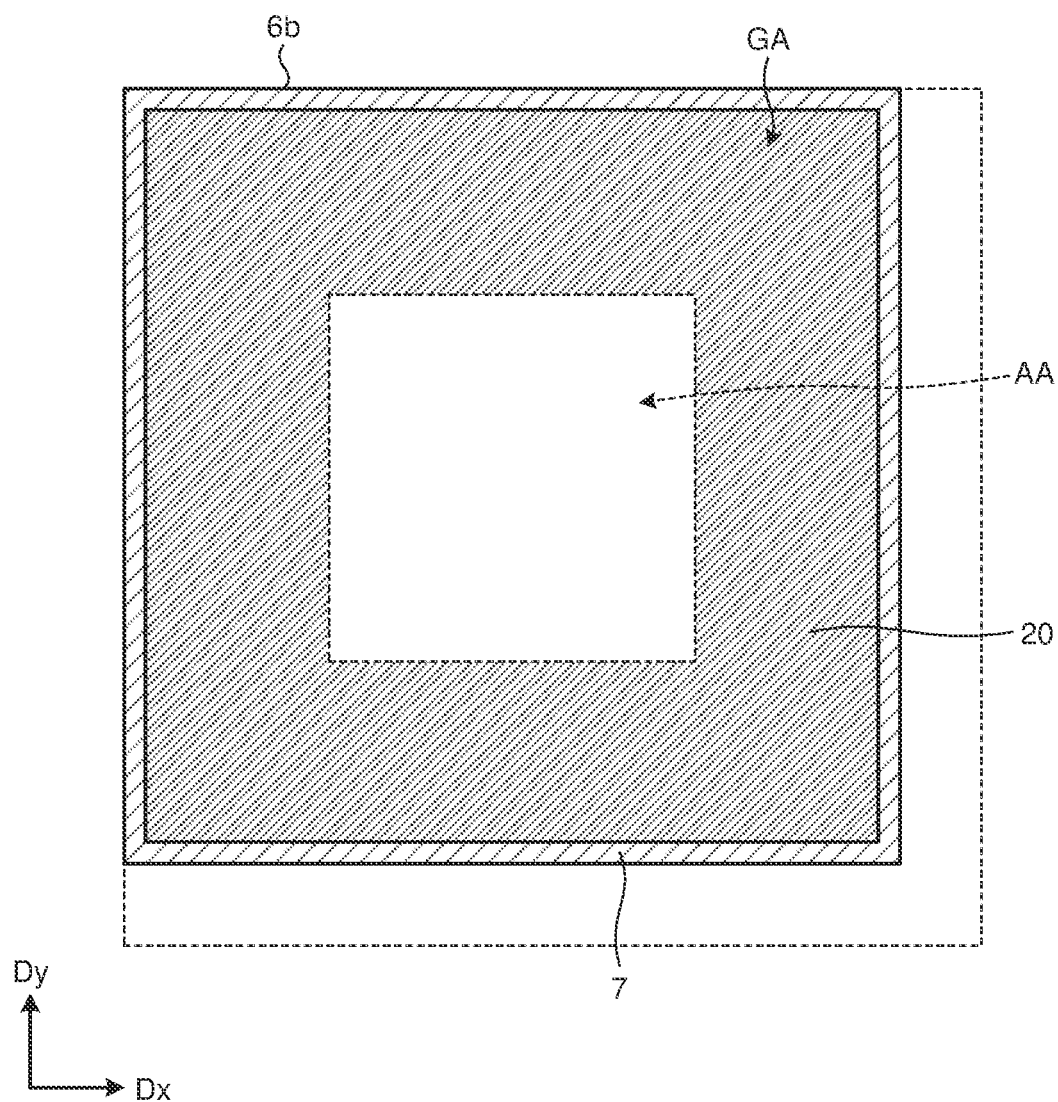
FIG. 11 is a plan view of a peripheral region on a second substrate of a light adjustment device according to a second embodiment when viewed in the Dz direction.
Figure 12:
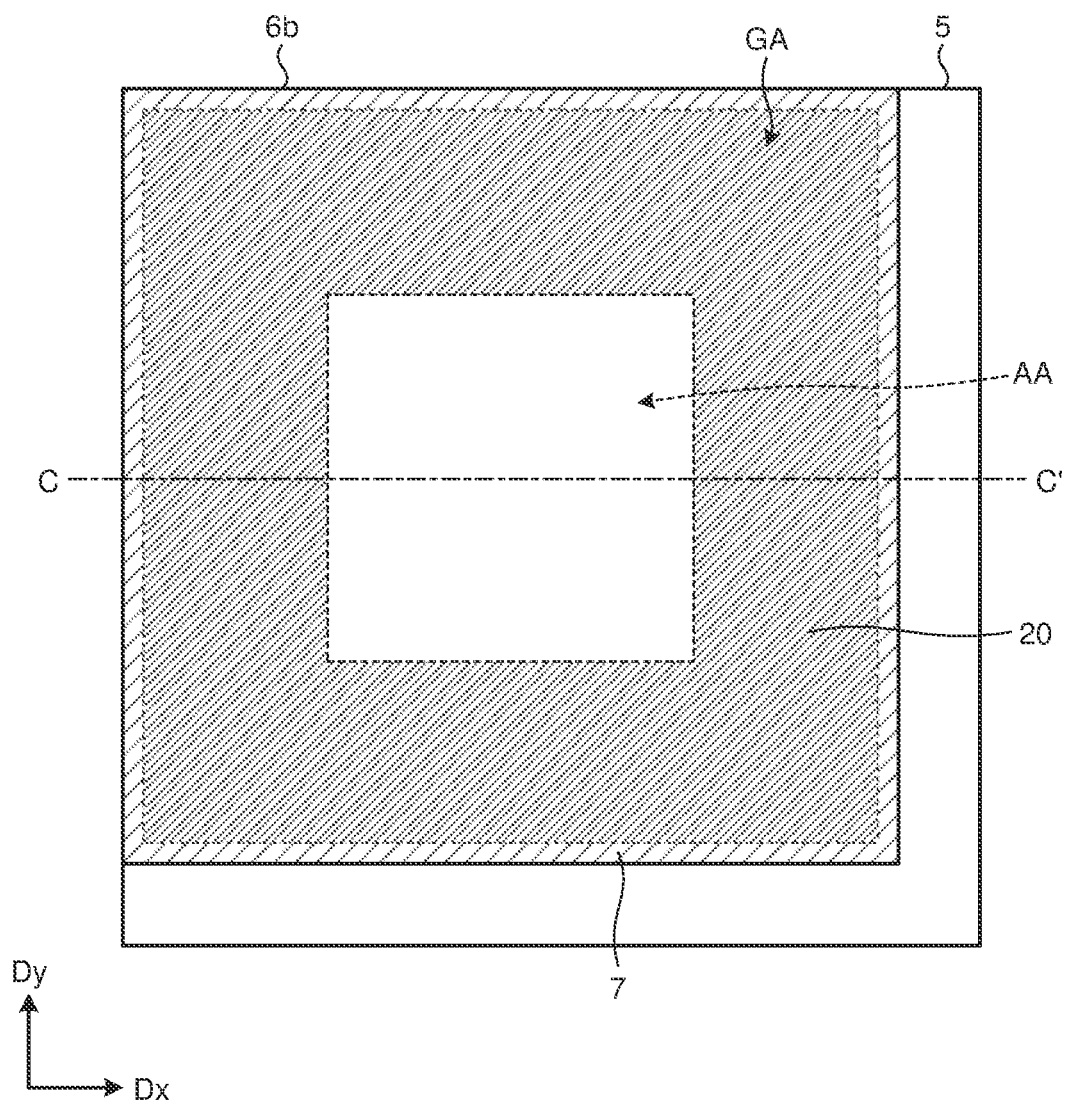
FIG. 12 is a perspective diagram in which a first substrate and the second substrate of the light adjustment device according to the second embodiment are placed over in the Dz direction.
Figure 13:
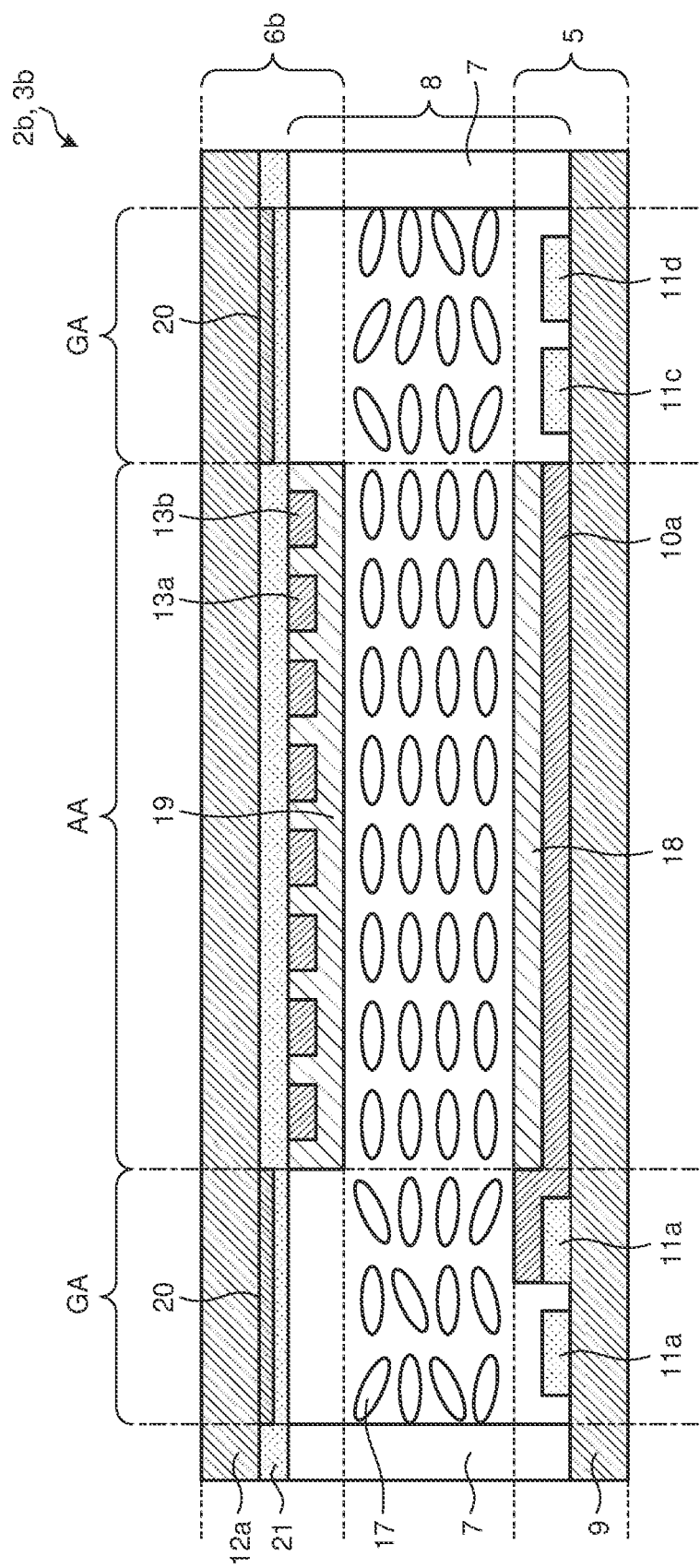
FIG. 13 is a sectional view along line C-C' illustrated in FIG. 12.

FIG. 11 is a plan view of the peripheral region on a second substrate of a light adjustment device according to a second embodiment when viewed in the Dz direction. FIG. 12 is a perspective diagram in which a first substrate and the second substrate of the light adjustment device according to the second embodiment are placed over in the Dz direction. FIG. 13 is a sectional view along line C-C' illustrated in FIG. 12. Note that, in the following description, any constituent component identical to that described above in the first embodiment is denoted by the same reference sign and duplicate description thereof is omitted, and any difference from the first embodiment will be described. In FIGS. 11 and 12, illustration of the light adjustment region AA is omitted for simplification.

In the configuration of the second embodiment illustrated in FIGS. 11, 12, and 13, a light-shielding layer 20 is provided on a second substrate 6b across the entire surface of the peripheral region GA outside the light adjustment region AA.

The light-shielding layer 20 is provided on the liquid crystal layer 8 side of a base material 12a of the second substrate 6b. The liquid crystal layer 8 side of the base material 12a of the second substrate 6b on which the light-shielding layer 20 is provided is covered by a flattening film 21. The flattening film 21 is, for example, a resin insulating film made of an organic material. The drive electrodes 13 and the second metal wires 14 are provided on the liquid crystal layer 8 side of the flattening film 21.

The light-shielding layer 20 is made of, for example, a black resin material. The light-shielding layer 20 is not limited to a black resin material but may be made of, for example, a metallic material having light shieldability.

With such a configuration, light leakage attributable to orientation disorder of the liquid crystal molecules 17 can be prevented in the peripheral region GA outside the light adjustment region AA.

Note that, when a first liquid crystal cell 2b and a second liquid crystal cell 3b are stacked to constitute the light adjustment device 1, the configuration of the second embodiment illustrated in FIGS. 11, 12, and 13 may be applied to at least one of the liquid crystal cells. More preferably, the configuration of the first embodiment illustrated in FIGS. 11, 12, and 13 is desirably applied to the second liquid crystal cell 3b closer to a target object of light emission from the illumination instrument 100. For example, in a configuration including a plurality of combinations of stacked first liquid crystal cell 2b and second liquid crystal cell 3b, the configuration of the second embodiment illustrated in FIGS. 11, 12, and 13 is desirably applied to a liquid crystal cell closer to a target object of light emission from the illumination instrument 100.

With the above-described configuration of the second embodiment, light leakage attributable to orientation disorder of the liquid crystal molecules 17 can be prevented in the peripheral region GA outside the light adjustment region AA, and thus degradation of a light adjustment function can be prevented.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure.

What is claimed is:

1. A light adjustment device comprising a plurality of liquid crystal cells each including
    a light adjustment region that polarizes light emitted from a light source,
    a peripheral region surrounding the light adjustment region,
    the liquid crystal cells being stacked in a direction in which the light is emitted, wherein
    the liquid crystal cells each include
        a first substrate in which a plurality of first metal wires are provided, and
        a second substrate in which a plurality of second metal wires are provided and that sandwiches a liquid crystal layer with the first substrate,
    the first metal wires are provided at intervals in a wiring layer on the first substrate,
    the second metal wires, which have an L-shaped structure and include slits, are provided at intervals in a wiring layer on the second substrate, and
    across an entire surface of the peripheral region outside the light adjustment region of at least one of the liquid crystal cells, light is blocked at gaps between the first metal wires by the second metal wires in the direction in which the light is emitted, and light is blocked at gaps between the second metal wires by the first metal wires in the direction in which the light is emitted.

2. The light adjustment device according to claim 1, wherein across the entire surface of the peripheral region outside the light adjustment region of one liquid crystal cell closer to a light emission target among the liquid crystal cells, light is blocked at the gaps between the first metal wires by the second metal wires in the direction in which the light is emitted, and light is blocked at the gaps between the second metal wires by the first metal wires in the direction in which the light is emitted.

3. A light adjustment device in which a plurality of liquid crystal cells each including a light adjustment region that polarizes light emitted from a light source are stacked in a direction in which light is emitted, and a peripheral region surrounding the light adjustment region, wherein the liquid crystal cells each include a first substrate in which a plurality of first metal wires are provided, and a second substrate in which a plurality of second metal wires are provided and that sandwiches a liquid crystal layer with the first substrate, the first metal wires are provided at intervals in a wiring layer on the first substrate, the second metal wires, which have an L-shaped structure and include slits, are provided at intervals in a wiring layer on the second substrate, and across an entire surface of the peripheral region outside the light adjustment region of at least one of the liquid crystal cells, a light-shielding layer is provided on a substrate closer to a light emission target among the first and second substrates.

4. The light adjustment device according to claim 3, wherein across the entire surface of the peripheral region outside the light adjustment region of one liquid crystal cell closer to a light emission target among the liquid crystal cells, a light-shielding layer is provided on a substrate closer to the light emission target among the first and second substrates.

* * * * *